United States Patent Office 2,741,637
Patented Apr. 10, 1956

2,741,637

METHOD FOR OBTAINING SULPHUR-FREE OXIMES FROM OXIME-SULPHUR MIXTURES

Harry Welz, Krefeld, Germany, assignor to Farbenfabriken Bayer Aktiengesellschaft, Leverkusen, Germany, a corporation of Germany No Drawing. Application January 23, 1953,
Serial No. 333,009

Claims priority, application Germany January 25, 1952

5 Claims. (Cl. 260—566)

In the preparation of oximes by the reduction of salts of mononitro cycloalkanes with hydrogen sulphide in an acid solution according to the application Ser. No. 260,320, now Patent No. 2,696,505, oxime-sulphur mixtures accrue.

The separation of the oximes and sulphur can be carried out with organic solvents, such as for example, alcohol. The oximes obtained in this way are, however, not sulphur-free. The dissolving of oximes in caustic alkali solution and reprecipitation with mineral acid does not yield sulphur-free products, because sulphur dissolves too, which, on neutralizing with mineral acid precipitates again along with the oxime.

It has now been found that sulphur-free oximes of cycloalkanes may be obtained by extracting the mixtures with caustic alkali solution and neutralizing with hydrogen sulphide.

Sulphur-free oximes of cycloalkanes which may be obtained according to the invention are for example: cyclopentanoneoxime, 1-methyl-cyclopentanoneoxime-3, cyclohexanoneoxime and 1-methyl-cyclohexanoneoxime-2.

The separation may, for example, be carried out by stirring the oxime-sulphur mixture with dilute aqueous caustic alkali solution, for example sodium, potassium or lithium hydroxide solution, preferably with an about 10 to about 20 per cent and especially an about 10 percent solution of caustic soda or caustic potash. It is suitable to use only just so much lye as is required for the complete dissolution of the oxime. An excess of lye would cause a greater amount of sulphur to be dissolved. The required amount of lye can easily be established in each case by a simple experiment.

Hydrogen sulphide is then introduced into the solution until the latter is approximately saturated. Thus will be the case when the alkali hydroxide is converted into alkali hydrosulphide. The sulphur dissolved from the oxime-sulphur-mixture by the lye will not thereby be precipitated, but kept in solution in the form of polysulphide.

The alkali hydrosulphide solution which still contains a small amount of oxime may be re-used for the reduction of further nitro compounds thereby reducing the loss of oxime to negligible proportions.

Generally the mentioned operations are carried out at room temperature.

*Example*

100 g. of a mixture obtained by the reduction of nitrocyclohexane with hydrogen sulphide, which consists of 73 g. of cyclohexanone oxime and 27 g. of sulphur, are stirred at room temperature with 260 g. of a 10 per cent solution of caustic soda for 30 minutes and filtered. The oxime dissolves entirely. 24 g. of sulphur remain on the filter after washing and drying; 3 g. of sulphur went into the solution. 22 g. of hydrogen sulphide gas are introduced at room temperature into the filtrate within an hour. The precipitated oxime will be filtered off, washed with 50 g. of cold water and dried. 69 g. of sulphur-free oxime are obtained. The filtrate in which four grams of oxime are still dissolved may be re-used for the reduction of nitrocyclohexane.

I claim:
1. Process for obtaining sulphur-free oximes from oxime-sulphur mixtures obtained by reducing salts of mononitrocycloalkanes with hydrogen sulphide in an acid solution, which comprises extracting the mixtures with caustic alkali solution and neutralizing the solution thus obtained with hydrogen sulphide.

2. Process for obtaining sulphur-free oximes from oxime-sulphur-mixtures obtained by reducing salts of mononitrocycloalkanes with hydrogen sulphide in an acid solution, which comprises extracting the mixtures with an about 10 to about 20% solution of caustic alkali and neutralizing the solution thus obtained with hydrogen sulphide.

3. Process for obtaining sulphur-free oximes from oxime-sulphur mixtures obtained by reducing salts of mononitro cycloalkanes with hydrogen sulphide in an acid solution, which comprises extracting the mixtures with an about 10% solution of caustic soda and neutralizing the solution thus obtained with hydrogen sulphide.

4. Process for obtaining sulphur-free oximes from oxime-sulphur mixtures obtained by reducing salts of mononitro cycloalkanes with hydrogen sulphide in an acid solution, which comprises extracting the mixtures with an about 10% solution of caustic soda and neutralizing the solution thus obtained with hydrogen sulphide, working at room temperature.

5. Process for obtaining sulphur-free cyclohexanone oxime from an oxime-sulphur mixture obtained by reducing a salt of mononitrocyclohexane with hydrogen sulphide in an acid solution, which comprises extracting the mixture with an about 10% solution of caustic soda and neutralizing the solution thus obtained with hydrogen sulphide, working at room temperature.

References Cited in the file of this patent

UNITED STATES PATENTS

| 2,423,180 | Doumani et al. | July 1, 1947 |
| 2,638,482 | Grundmann | May 12, 1953 |

FOREIGN PATENTS

| 455,756 | Canada | Apr. 5, 1949 |
| 825,544 | Germany | Dec. 20, 1951 |

OTHER REFERENCES

Houben: Die Methoden der Org. Chem., vol. 2, p. 402 (1943).